(12) United States Patent
Furuichi

(10) Patent No.: US 10,555,209 B2
(45) Date of Patent: Feb. 4, 2020

(54) WIRELESS ACCESS NETWORK DEVICE

(71) Applicant: NEC Corporation, Minato-ku, Tokyo (JP)

(72) Inventor: Hideyuki Furuichi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/902,135

(22) Filed: Feb. 22, 2018

(65) Prior Publication Data
US 2018/0270704 A1    Sep. 20, 2018

(30) Foreign Application Priority Data
Mar. 16, 2017 (JP) ................................. 2017-051528

(51) Int. Cl.
| | | |
|---|---|---|
| *H04W 28/02* | (2009.01) | |
| *H04L 29/08* | (2006.01) | |
| *H04W 80/06* | (2009.01) | |
| *H04W 24/08* | (2009.01) | |
| *H04W 88/08* | (2009.01) | |

(52) U.S. Cl.
CPC ....... *H04W 28/0289* (2013.01); *H04L 67/141* (2013.01); *H04W 24/08* (2013.01); *H04W 80/06* (2013.01); *H04W 28/0205* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2004/0242219 A1* | 12/2004 | Oie | ......................... | H04L 47/10 455/422.1 |
| 2005/0102412 A1* | 5/2005 | Hirsimaki | ........... | H04L 43/0882 709/232 |
| 2005/0120090 A1* | 6/2005 | Kamiya | .............. | H04L 41/0896 709/213 |
| 2005/0213586 A1* | 9/2005 | Cyganski | ............ | H04L 41/0896 370/395.41 |
| 2008/0089230 A1* | 4/2008 | Kootstra | ................. | H04L 47/10 370/235 |
| 2008/0089250 A1* | 4/2008 | Jung | ..................... | H04L 1/0028 370/276 |
| 2009/0180384 A1* | 7/2009 | Ansari | .................... | H04L 47/10 370/235 |
| 2010/0215008 A1* | 8/2010 | Wang | .................... | H04W 72/10 370/329 |
| 2014/0185453 A1* | 7/2014 | Hwang | ............... | H04L 43/0864 370/236 |
| 2017/0257284 A1* | 9/2017 | Wood | .................... | H04L 12/146 |
| 2017/0331753 A1* | 11/2017 | Li | .......................... | H04L 47/27 |
| 2018/0103059 A1* | 4/2018 | Kurakami | .............. | H04L 12/66 |

FOREIGN PATENT DOCUMENTS

| | | |
|---|---|---|
| JP | 2004193841 A | 7/2004 |
| JP | 2016174287 A | 9/2016 |

* cited by examiner

*Primary Examiner* — Kodzovi Acolaste

(57) ABSTRACT

A wireless access network device includes a control unit configured to set a parameter indicating a data amount that a receiving device can receive, in a header of a protocol of at least one of a transport layer and a layer superordinate to the transport layer, the protocol being utilized when a transmitting device transmits data to the receiving device, and a communication unit that communicates with a terminal device.

8 Claims, 6 Drawing Sheets

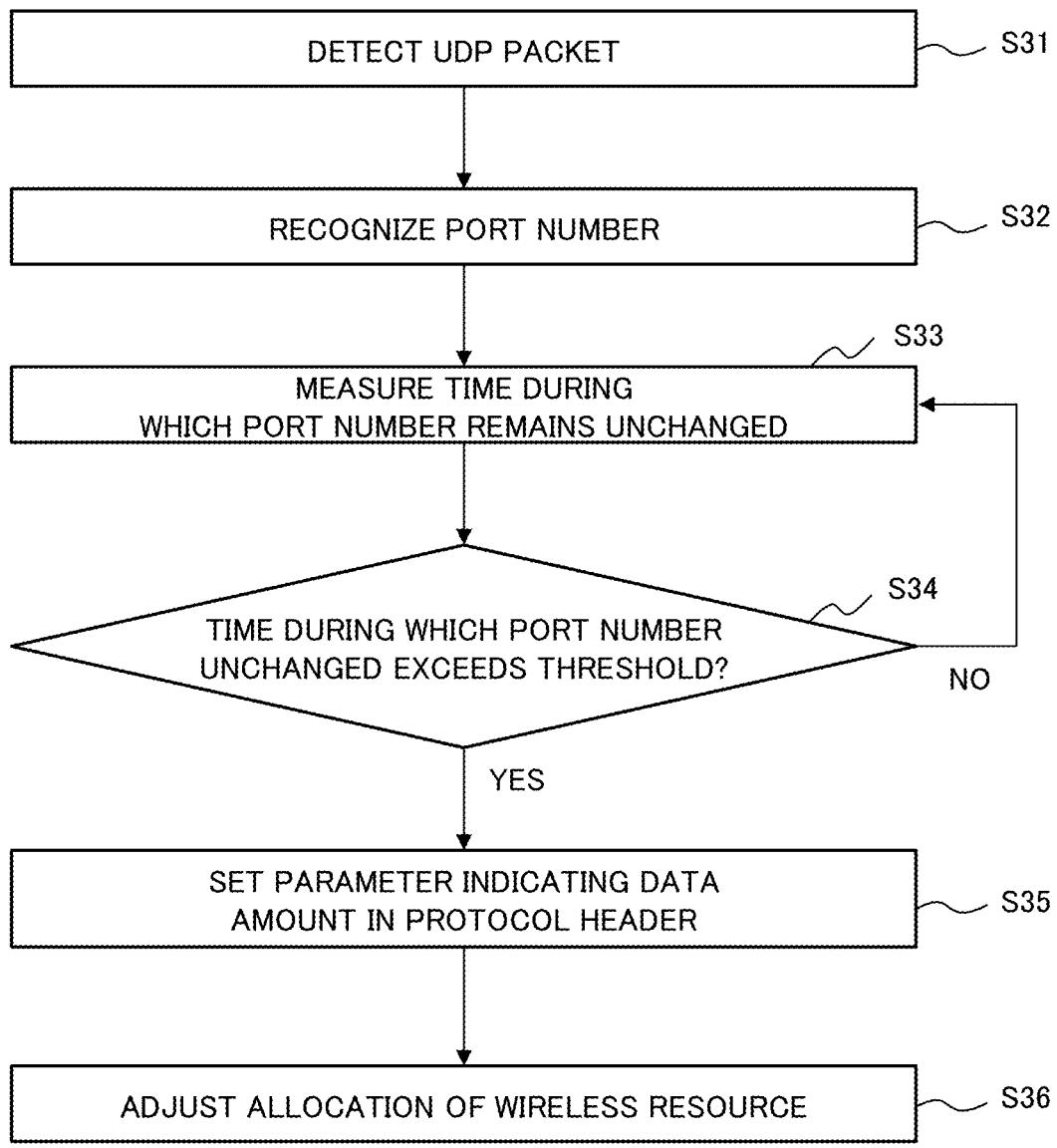

WIRELESS ACCESS NETWORK DEVICE

This application is based upon and claims the benefit of priority from Japanese Patent Application No. 2017-051528, filed on Mar. 16, 2017, the disclosure of which is incorporated herein in its entirety by reference.

TECHNICAL FIELD

The present invention relates to a wireless access network device.

BACKGROUND ART

Protocols utilized among devices when a terminal device makes communication through a base station and a network can be divided into layers, as shown in FIG. 1. Examples of a layer model include a transmission control protocol (TCP)/internet protocol (IP) layer model, and an open systems interconnection (OSI) reference model formulated by the International Organization for Standardization. FIG. 1 represents, as an example of the layer model, the layers based on the TCP/IP layer model.

The TCP/IP layer model includes an application layer, a transport layer, an internet layer, and a network interface layer, from the top. In the application layer, superordinate to the transport layer, applications that utilize the protocol of the transport layer are located.

The application layer corresponds to an application layer, a presentation layer, and a session layer based on the OSI reference model. In addition, the internet layer corresponds to a network layer based on the OSI reference model.

Among the mentioned layers, a packet data convergence protocol (PDCP) controls transmission of communication data between the terminal device and the base station. In addition, a general packet radio service tunneling protocol for user plane (GTP-U) controls the transmission of communication data between the base station and a gateway device.

Examples of the protocol of the transport layer include the TCP and a user datagram protocol (UDP). Examples of the protocol of the internet layer include the IP. The IP controls the transmission of communication data between the terminal device and a server device, utilizing the PDCP and the GTP-U.

The TCP controls the transmission of the communication data between the terminal device and the server device, utilizing the IP. Accordingly, the terminal points of communication data in the transport layer and the internet layer are the terminal device and the gateway device or the server device, respectively.

Here, the processing performed by the TCP in the transport layer will be described. The TCP is a protocol to transmit communication data with a header added to the leading end thereof. The fields constituting the header include a window size, which is a parameter used for notifying a data amount that the receiving side can receive at a time, to the transmitting side. In other words, the window size corresponds to the size of the communication data that the transmitting side can transmit at a time, without the need to confirm the reception. The communication data based on the window size is transmitted, between the terminal device and the server device.

Regarding the control of the window size, for example, JP 2004-193841A, and JP 2016-174287A disclose that the gateway device or the server device configures the window size, based on a buffer capacity or contents to be distributed to the terminal device.

[PTL 1] JP2004-193841A
[PLT 2] JP2016-174287A

The wireless base station allocates a wireless resource to the terminal device, based on the situation of the wireless communication. Here, the amount of the wireless resource, allocated by the wireless base station to the terminal device, may differ from the window size of the data to be transmitted, for example, from the server device to the terminal device. In this case, the data amount transmitted and received between the terminal device and the server device may vary before and after passing through the wireless base station, which may provoke a congestion.

SUMMARY

A wireless access network device according to an example aspect of the invention includes a control unit configured to set a parameter indicating a data amount that a receiving device can receive, in a header of a protocol of at least one of a transport layer and a layer superordinate to the transport layer, the protocol being utilized when a transmitting device transmits data to the receiving device, and a communication unit that communicates with a terminal device.

The present invention can suppresses a congestion in a network.

BRIEF DESCRIPTION OF THE DRAWINGS

Exemplary features and advantages of the present invention will become apparent from the following detailed description when taken with the accompanying drawings in which:

FIG. 8 is a flowchart showing an operation according to a third example embodiment of the present invention.

EXAMPLE EMBODIMENTS

Next, detailed explanation will be given for example embodiments, with reference to the drawings.

First Example Embodiment

Figure 1:
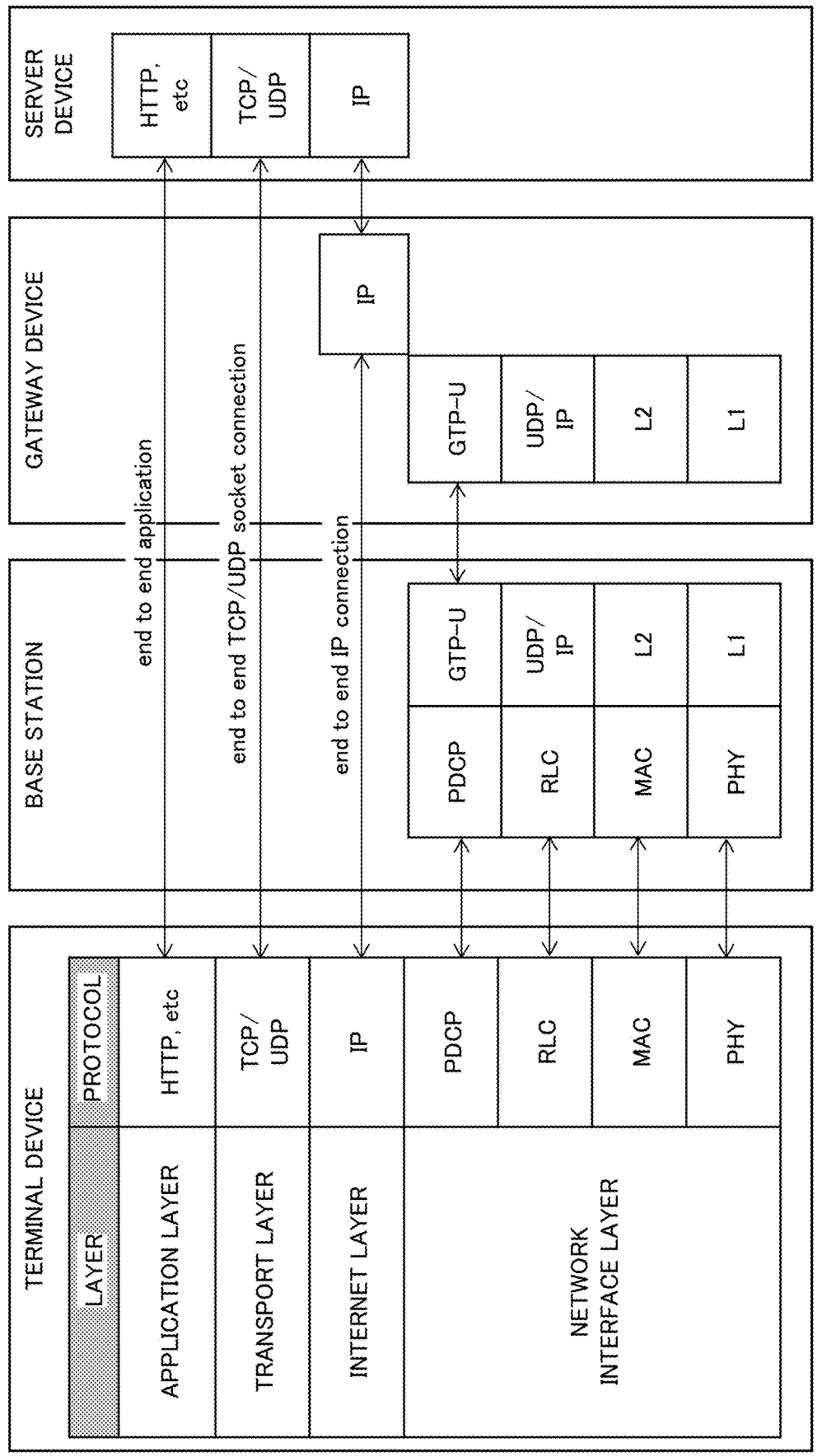
FIG. 1 is a block diagram showing a layer structure of a known communication system.

Components referred to in the following example embodiments are applicable to the communication system shown in FIG. 1.

Figure 2:
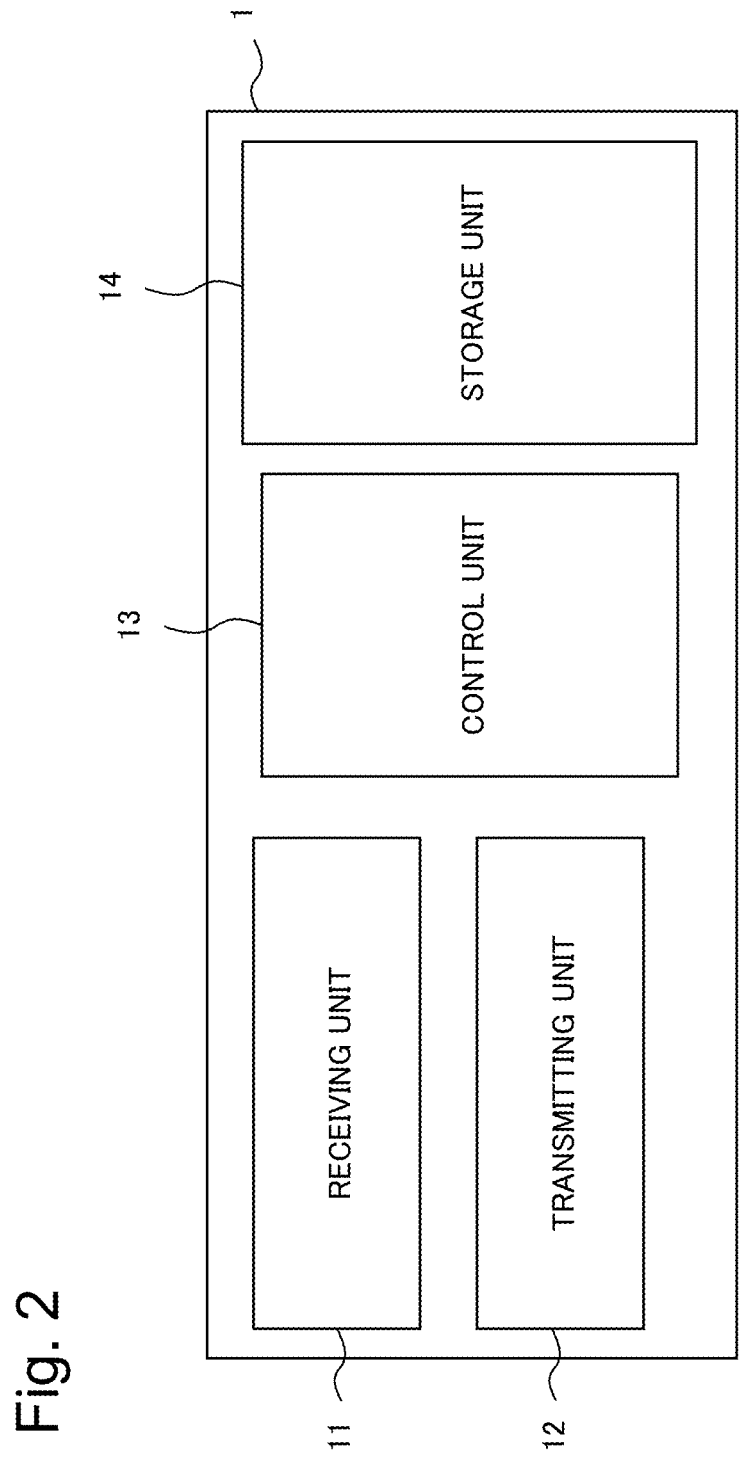
FIG. 2 is a block diagram showing a configuration of a terminal device according to a first example embodiment of the present invention.

FIG. 2 is a block diagram showing a configuration of a terminal device 1 according to the first example embodiment of the present invention. The terminal device 1 includes a receiving unit 11, a transmitting unit 12, a control unit 13, and a storage unit 14. The terminal device 1 communicates with a wireless access network device 2, using the receiving unit 11 and the transmitting unit 12.

Figure 3:
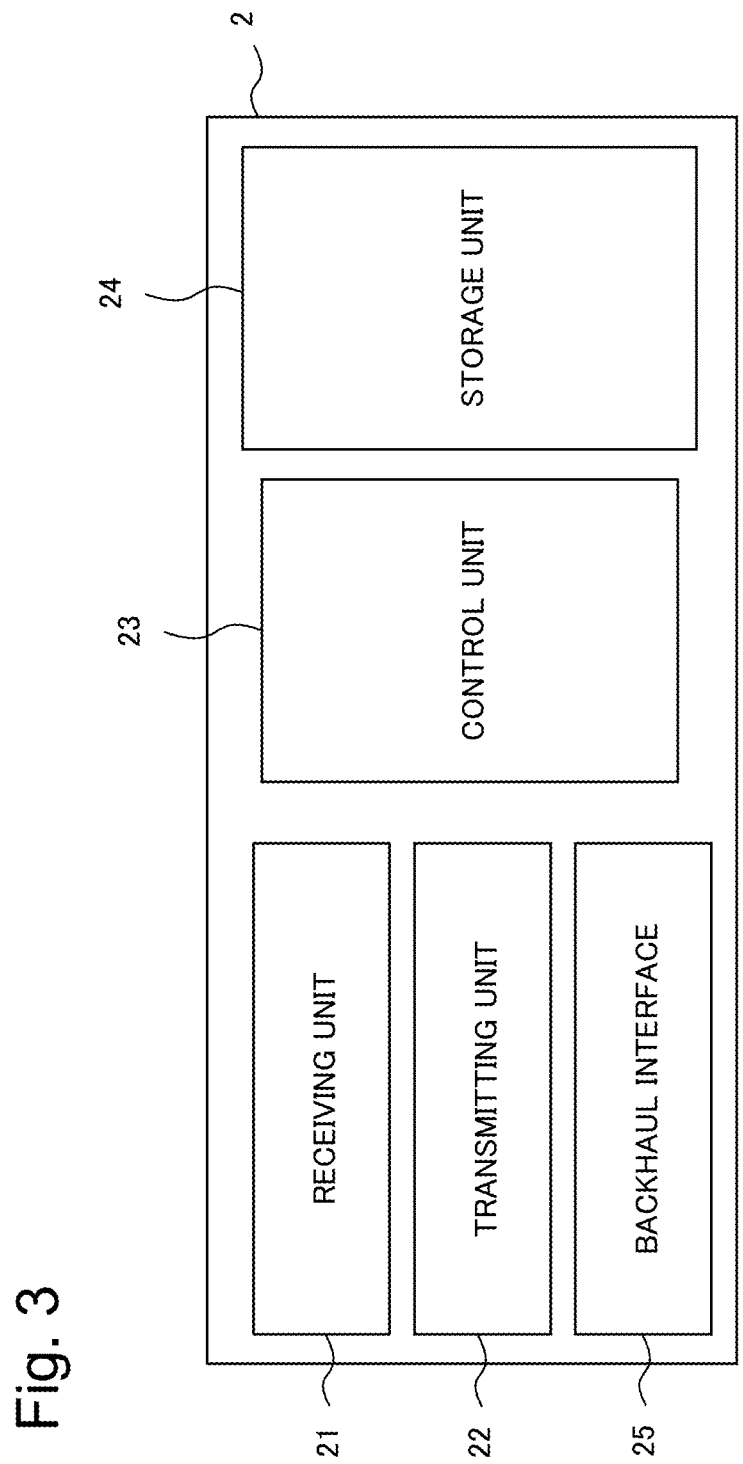
FIG. 3 is a block diagram showing a configuration of a wireless access network device according to the first example embodiment of the present invention.

FIG. 3 is a block diagram showing a configuration of the wireless access network device 2 according to the first example embodiment of the present invention. The wireless access network device 2 includes a receiving unit 21, a transmitting unit 22, a control unit 23, a storage unit 24, and a backhaul interface 25. The wireless access network device 2 communicates with the terminal device 1 using the receiving unit 21 and the transmitting unit 22. In addition, the wireless access network device 2 is connected to a gateway device 3 via the backhaul interface 25.

The wireless access network device 2 may be a base station. The base station may be a Node B (NB), an eNode B (eNB), a Home Node B (HNB), or a Home eNode B (HeNB). Among the mentioned nodes, the eNode B may be a baseband unit (BBU) employed in a centralized radio access network (C-RAN) architecture. In other words, the eNode B may be a radio access network (RAN) node connected to one or a plurality of remote radio heads (RRH).

Further, the wireless access network device 2 may be a public wireless Local Access Network (LAN), or a router of a wireless LAN utilized in an office building or a home.

Figure 4:
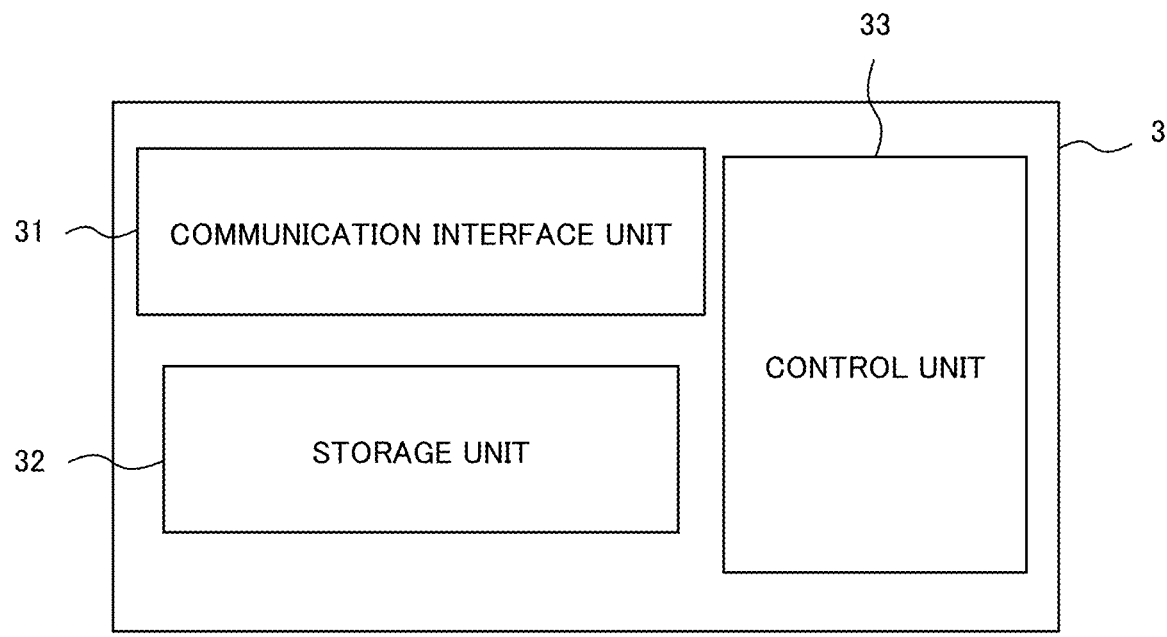
FIG. 4 is a block diagram showing a configuration of a gateway device according to the first example embodiment of the present invention.

FIG. 4 is a block diagram showing a configuration of the gateway device 3 according to the first example embodiment of the present invention. The gateway device 3 includes a communication interface unit 31, a storage unit 32, and a control unit 33.

Figure 5:
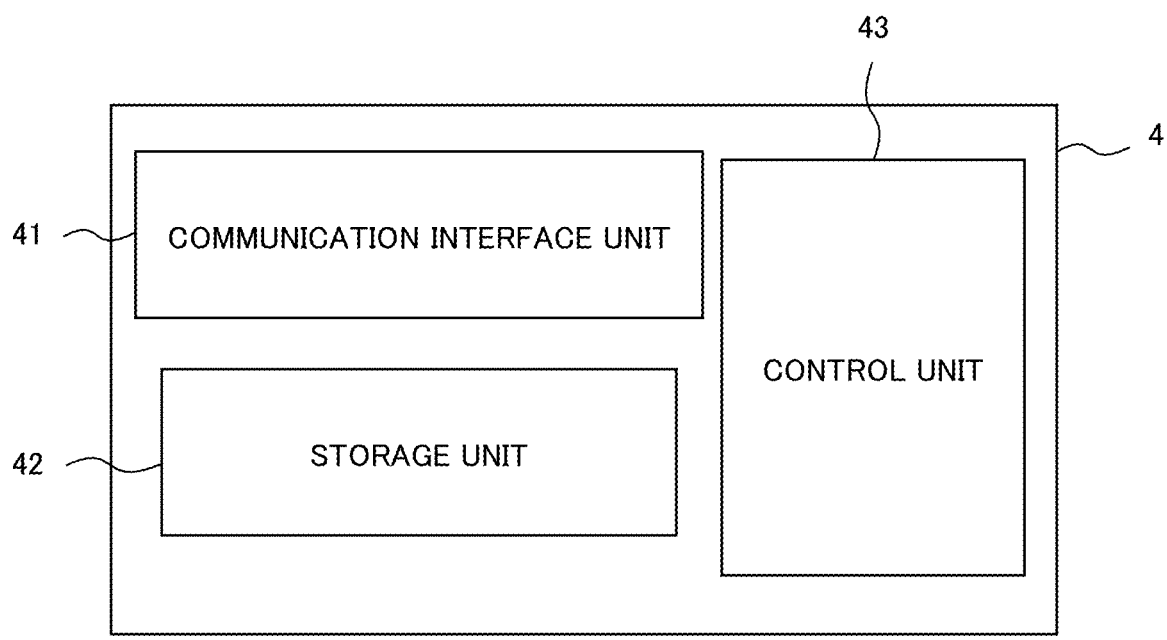
FIG. 5 is a block diagram showing a configuration of a server device according to the first example embodiment of the present invention.

FIG. 5 is a block diagram showing a configuration of a server device 4 according to the first example embodiment of the present invention. The server device 4 includes a communication interface unit 41, a storage unit 42, and a control unit 43.

Figure 6:
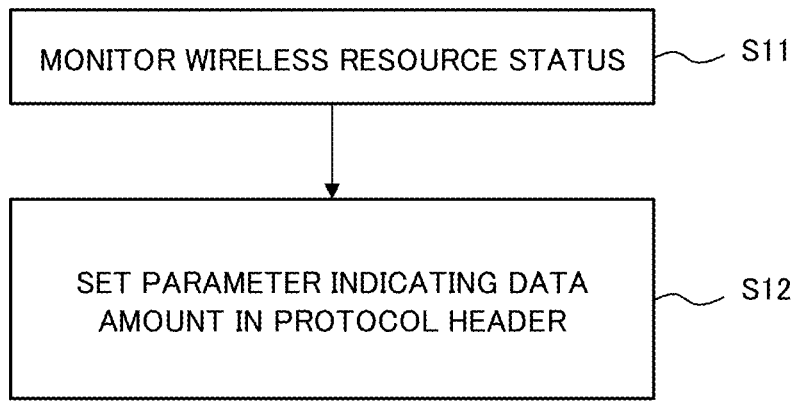
FIG. 6 is a flowchart showing an operation according to the first example embodiment of the present invention.

Referring to FIG. 6, an operation according to this example embodiment will be described.

The control unit 23 of the wireless access network device 2 monitors the size of the wireless resource allocated to the terminal device (step S11). The size of the wireless resource refers to, for example, the number of resource blocks per unit time or a wireless frequency bandwidth, allocated to the terminal device 1 and other terminal devices.

Then the control unit 23, based on the size of the monitoring wireless resource, sets a parameter indicating a data amount that the receiving device can receive, in the header of the protocol of at least one of the transport layer and layers superordinate to the transport layer, the protocol being utilized when the transmitting device transmits data to the receiving device (step S12).

The protocol of the transport layer may be, for example, the TCP. In addition, the protocol of the layers superordinate to the transport layer may be, for example, a hyper text transfer protocol (HTTP) utilized by the server device and a Web browser, a simple mail transfer protocol (SMTP) or a post office protocol (POP3) for transmitting and receiving an e-mail, or a file transfer protocol (FTP) for transferring a file.

The protocol in which the control unit 23 sets the parameter may be the one in an uplink protocol data unit (PDU) transmitted from the terminal device 1 to the server device 4, or in a downlink PDU transmitted from the server device 4 to the terminal device 1.

The protocol referred to above may be, for example, a protocol utilized when data is transmitted between the terminal device 1 and the server device 4, through the UDP. Such protocol may have a function of, for example, congestion avoidance, flow control, and retransmission.

Here, the transmitting device may be the terminal device, and the receiving device may be the server device. Conversely, the receiving device may be the terminal device, and the transmitting device may be the server device.

Further, the parameter indicating the data amount may be, for example, a window size. The setting of the parameter may include, for example, decreasing the value of the window size.

The control unit 23 may be configured, for example, to decrease the data amount that the receiving device can receive, the data amount being specified by the parameter of the header of the protocol, when the control unit 23 decides that the size of the wireless resource actually allocated to the terminal device 1 is smaller than the data amount that the receiving device can receive. With such operation, the control unit 23 enables the data amount transmitted and received between the server device 4 and the terminal device 1, using the protocol of at least one of the transport layer and the layers superordinate to the transport layer, to match the size of the wireless resource actually allocated to the terminal device 1.

Second Example Embodiment

Figure 7:
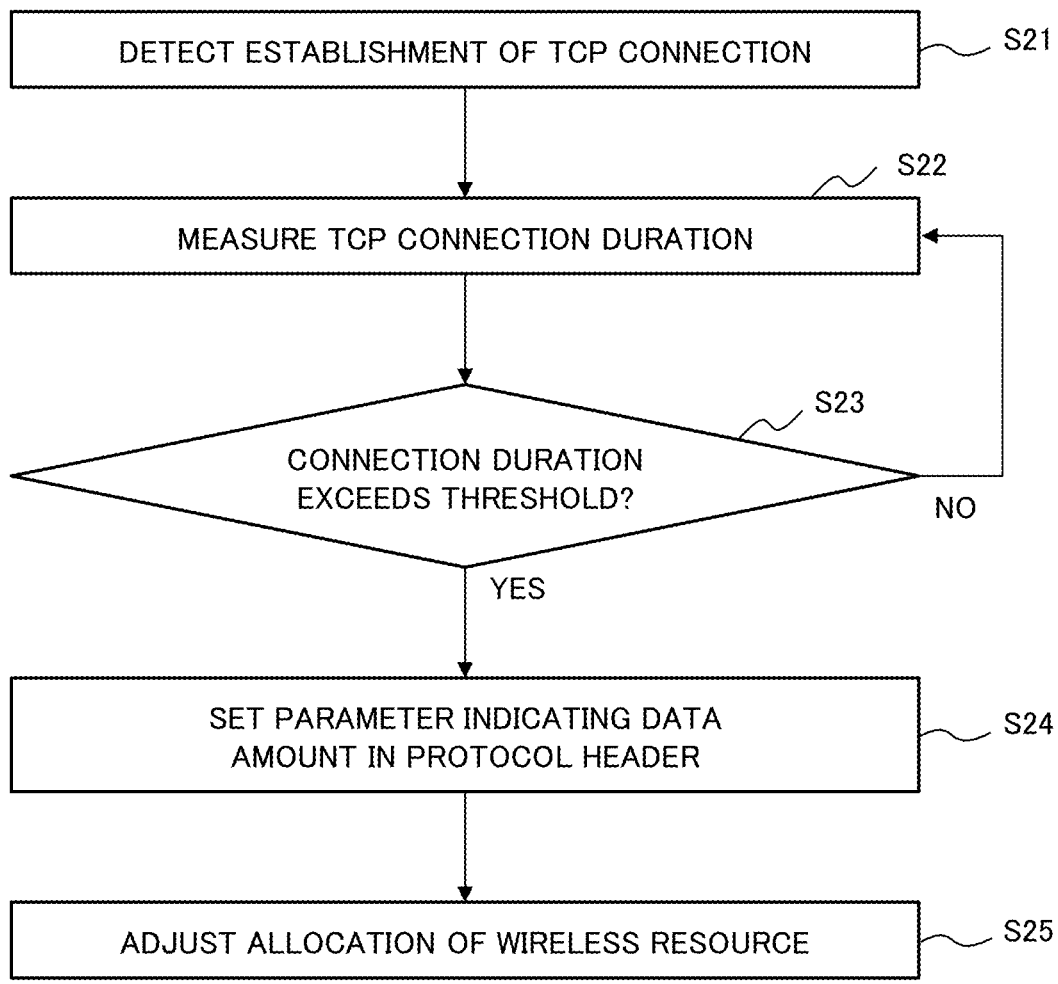
FIG. 7 is a flowchart showing an operation according to a second example embodiment of the present invention.

Referring to FIG. 7, an operation according to a second example embodiment will be described.

First, the control unit 23 reads the PDU of the TCP and the IP transmitted and received through the PDCP and the GTP-U, thereby detecting the establishment of the TCP connection (step S21).

Then the control unit 23 measures the connection duration, during which the TCP remains connected (step S22), and decides whether the connection duration has exceeded a predetermined threshold (step S23).

The control unit 23 may continue with the measurement of the connection duration, until the connection duration exceeds the threshold (step S22).

When the connection duration has exceeded the threshold, the control unit 23 sets the parameter indicating the data amount that the receiving device can receive, in the header of the protocol of at least one of the transport layer and the layers superordinate to the transport layer, utilized when the transmitting device transmits data to the receiving device (step S24).

The protocol of the transport layer may be, for example, the TCP. In addition, the protocol of the layers superordinate to the transport layer may be, for example, the HTTP, the SMTP, the POP3, or the FTP.

The protocol in which the control unit 23 sets the parameter may be the one in the uplink PDU transmitted from the terminal device 1 to the server device 4, or in the downlink PDU transmitted from the server device 4 to the terminal device 1.

The protocol referred to above may be, for example, a protocol utilized when data is transmitted between the terminal device 1 and the server device 4, through the UDP. Such protocol may have a function of, for example, congestion avoidance, flow control, and retransmission.

Here, the transmitting device may be the terminal device, and the receiving device may be the server device. Conversely, the receiving device may be the terminal device, and the transmitting device may be the server device.

Further, the parameter indicating the data amount may be, for example, a window size. The setting of the parameter may include, for example, decreasing the value of the window size.

The control unit 23 may set the value of a check sum utilized for checking an error between the TCP header and the data portion. In other words, the control unit 23 may calculate and rewrite the value of the check sum, based on the value of the parameter indicating the data amount, the value being set at step S24.

The control unit 23 transmits, to the terminal device 1 or the server device 4, a packet accompanied with the header including the parameter indicating the data amount set as above and having the value of the check sum. The control unit 23 may continue with the mentioned transmission, until disconnection of the TCP is detected.

Then the control unit 23 adjusts the allocation amount of the wireless resource to the terminal device 1 (step S25). The adjustment of the wireless resource includes, for example, narrowing or widening the bandwidth of the wireless frequency.

The setting of the parameter indicating the data amount that the receiving device can receive, and the adjustment of the allocation amount of the wireless resource may be performed, for example, according to a predetermined priority given to the terminal device 1.

The arrangement according to this example embodiment allows the parameter indicating the data amount that the receiving device can receive to be efficiently set, in the header of the protocol of at least one of the transport layer and the layers superordinate to the transport layer, with respect to the terminal device 1 maintaining the TCP connection for a long time. Further, the wireless resource can be controlled based on the setting of the parameter as above.

Third Example Embodiment

Referring to FIG. 8, an operation according to a third example embodiment will be described.

First, the control unit 23 detects a UDP packet in the transport layer (step S31), and recognizes a port number in the header of the UDP protocol (step S32).

Then the control unit 23 measures the time during which the port number recognized at step S32 remains unchanged (step S33), and decides whether the time during which the port number remains unchanged has exceeded a threshold (step S34).

The control unit 23 may continue with the measurement, until the time being measured exceeds the threshold (step S33).

When the time during which the port number remains unchanged has exceeded the threshold, the control unit 23 sets the parameter indicating the data amount that the receiving device can receive, in the header of the protocol of at least one of the transport layer and the layers superordinate to the transport layer, the protocol being utilized when the transmitting device transmits data to the receiving device (step S35).

The protocol of the transport layer may be, for example, the TCP. In addition, the protocol of the layers superordinate to the transport layer may be, for example, the HTTP, the SMTP, the POP3, or the FTP.

The protocol in which the control unit 23 sets the parameter may be the one in the uplink PDU transmitted from the terminal device 1 to the server device 4, or in the downlink PDU transmitted from the server device 4 to the terminal device 1.

The protocol referred to above may be, for example, a protocol utilized when data is transmitted between the terminal device 1 and the server device 4, through the UDP. Such protocol may have a function of, for example, congestion avoidance, flow control, and retransmission.

Here, the transmitting device may be the terminal device, and the receiving device may be the server device. Conversely, the receiving device may be the terminal device, and the transmitting device may be the server device.

Further, the parameter indicating the data amount may be, for example, a window size. The setting of the parameter may include, for example, decreasing the value of the window size.

In addition, the control unit 23 may adjust the allocation amount of the wireless resource, based on the setting of the parameter as above (step S36). Step S35 and step S36 may be performed in a similar way to step S24 and step S25 described in the second example embodiment.

Note that, although the control unit 23 is configured to measure the time during which the port number of the UDP packet remains unchanged in this example embodiment, the addresses of the transmission destination and the transmission source, indicated by the IP packet in the internet layer, may be employed instead of the UDP packet port number.

The arrangement according to this example embodiment allows the parameter indicating the data amount that the receiving device can receive to be efficiently set, in the header of the protocol of at least one of the transport layer and the layers superordinate to the transport layer, the protocol being utilized when the transmitting device transmits data to the receiving device, with respect to the terminal device 1 maintaining the UDP communication for a long time. Further, the wireless resource can be controlled based on the setting of the parameter as above.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

For example, it is not mandatory to perform the steps of the processes described above, in a time series manner according to the order specified in each of the flowcharts. The steps of the mentioned processes may be performed, for example, in an order different from the flowchart, or in parallel.

In addition, the base station referred to in the foregoing description may include components such as a communication processing unit, a request unit, an information acquisition unit, and/or a notification unit. Further, a module including these components (e.g., a base station device, or a module for the base station device) may be provided. Still further, a method including the processes of the mentioned components may be provided, and a program for causing a processor to operate the processes of the components may be provided. In addition, a recording medium containing the mentioned program recorded thereon may be provided. As a matter of course, such module, method, program, and recording medium are included in the present invention.

Further, the terminal device referred to in the foregoing description may include components such as a radio frequency (RF) transceiver, an antenna, a baseband processor, an application processor, and a memory.

The RF transceiver performs an analog RF signal processing, to communicate with the base station. The analog RF signal processing performed by the RF transceiver may include frequency-up conversion, frequency-down conversion, and amplification. The RF transceiver may be coupled with the antenna and the baseband processor. More specifically, the RF transceiver may receive modulation symbol data (or orthogonal frequency division multiplexing (OFDM) symbol data) from the baseband processor, generate a transmission RF signal, and provide the transmission RF signal to the antenna. In addition, the RF transceiver may generate a baseband reception signal on the basis of a reception RF signal received through the antenna, and provide the baseband reception signal to the baseband processor.

The baseband processor performs a digital baseband signal processing (data plane processing) and a control plane processing, for the wireless communication. The digital baseband signal processing may include (a) data compression/decompression, (b) data segmentation/concatenation, (c) generation/decomposition of a transmission format (transmission frame), (d) transmission line encoding/decoding, (e) modulation (symbol mapping)/demodulation, and (f) generation of OFDM symbol data (baseband OFDM signal) through an inverse fast Fourier transform (IFFT). In addition, the control plane processing may include communication management of a layer 1 (e.g., transmission power control), a layer 2 (e.g., wireless resource management, and hybrid automatic repeat request (HARQ) processing), and a layer 3 (e.g., attach, mobility, and signaling related to phone call management).

In the case of LTE and LTE-Advanced for example, the digital baseband signal processing performed by the baseband processor may include signal processing of a packet data convergence protocol (PDCP) layer, a radio link control (RLC) layer, a medium access control (MAC) layer, and a physical (PHY) layer. In addition, the control plane processing performed by the baseband processor may include processings of a non-access stratum (NAS) protocol, a radio resource control (RRC) protocol, and a MAC control element (MACCE).

The baseband processor may include a modem processor that performs the digital baseband signal processing (e.g., digital signal processor (DSP)), and a protocol stack processor (e.g., central processing unit (CPU) that performs the control plane processing, or a micro processing unit (MPU)). In this case, the protocol stack processor that performs the control plane processing may be commonized with the application processor to be subsequently referred to.

The application processor is also called a CPU, an MPU, a microprocessor, or a processor core. The application processor may include a plurality of processors (plurality of processor cores). The application processor realizes various functions of the terminal device, by executing a system software program (operating system (OS)) read out from the memory or a non-illustrated storage device and various application programs (e.g., a phone call application, a WEB browser, a mailer, a camera application, a playback application).

In some implementations, the baseband processor and the application processor may be integrated on a single chip. In other words, the baseband processor and the application processor may be mounted as a single system on chip (SoC) device. The SoC device may also be called a system large scale integration (LSI), or a chip set.

The memory may be a volatile memory, a non-volatile memory, or a combination thereof. The memory may include a plurality of memory devices physically independent from each other. The volatile memory may be, for example, a static random-access memory (SRAM), a dynamic RAM (DRAM), or a combination thereof. The non-volatile memory may be a mask read-only memory (MROM), an electrically erasable programmable ROM (EEPROM), a flash memory, a hard disk drive, or any desired combination of two or more thereof. The memory may include, for example, an external memory device that can be accessed by the baseband processor, the application processor, and the SoC. The memory may include a built-in memory device integrated in the baseband processor, the application processor, or the SoC. Further, the memory may include a memory in a universal integrated circuit card (UICC).

The memory may store a software module (computer program) containing a group of commands and data for realizing the operation of the terminal device described in the foregoing example embodiments. In some implementations, the baseband processor or the application processor may be configured to realize the operation of the terminal device described in the foregoing example embodiments, by reading out the software module from the memory and executing the same.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded with the widest scope as defined by the limitations of the claims and equivalents.

Further, it is noted that the inventor's intent is to retain all equivalents of the claimed invention even if the claims are amended during prosecution.

What is claimed is:

1. A wireless access network device comprising:
hardware, including a processor and memory;
a control unit implemented at least by the hardware and configured to set a parameter indicating a data amount that a receiving device can receive, in a header of a protocol of at least one of a transport layer and a layer superordinate to the transport layer, the protocol being utilized when a transmitting device transmits data to the receiving device; and
a communication unit implemented at least by the hardware and that communicates with a terminal device,
wherein the control unit is configured to:
detect establishment of TCP connection;
measure a time during which the TCP remains connected; and
set the parameter when the time during which the TCP remains connected exceeds a threshold;
wherein the control unit is further configured to:
detect a UDP packet in the transport layer;
recognize a port number indicated by the header of the UDP packet;
measure a time during which the port number remains unchanged; and
set the parameter when the time during which the port number remains unchanged exceeds a threshold.

2. The wireless access network device according to claim 1,
wherein the control unit is configured to:
monitor a size of a wireless resource allocated to the terminal device; and
set the parameter based on the size of the wireless resource.

3. The wireless access network device according to claim 1,
wherein the control unit controls a wireless resource to be allocated to the terminal device, based on the parameter that has been set.

4. The wireless access network device according to claim 1,
wherein the transmitting device is the terminal device, and the receiving device is a server device, or
the receiving device is the terminal device, and the transmitting device is the server device.

5. The wireless access network device according to claim 1,
wherein the setting of the parameter includes decreasing a value of the parameter.

6. A wireless access network device comprising:
hardware, including a processor and memory;
a control unit implemented at least by the hardware and configured to set a parameter indicating a data amount that a receiving device can receive, in a header of a protocol of at least one of a transport layer and a layer superordinate to the transport layer, the protocol being utilized when a transmitting device transmits data to the receiving device; and
a communication unit implemented at least by the hardware and that communicates with a terminal device,
wherein the control unit is further configured to:
detect establishment of TCP connection in the transport layer;
measure a number of the terminal devices connected via the TCP; and
set the parameter when the number of the terminal devices connected via the TCP exceeds a threshold;
wherein the control unit is further configured to:
detect a UDP packet in the transport layer;
recognize a port number indicated by the header of the UDP packet;
measure a time during which the port number remains unchanged; and
set the parameter when the time during which the port number remains unchanged exceeds a threshold.

7. A wireless access network device comprising:
hardware, including a processor and memory;
a control unit implemented at least by the hardware and configured to set a parameter indicating a data amount that a receiving device can receive, in a header of a protocol of at least one of a transport layer and a layer superordinate to the transport layer, the protocol being utilized when a transmitting device transmits data to the receiving device; and
a communication unit implemented at least by the hardware and that communicates with a terminal device,
wherein the control unit is further configured to:
detect an IP packet in an Internet layer;
recognize at least one of a transmission source address and a transmission destination address indicated by the header of the IP packet;
set the parameter when a time during which at least one of the transmission source address and the transmission destination address remain unchanged exceeds a threshold; and
wherein the control unit is configured to:
detect a UDP packet in the transport layer;
recognize a port number indicated by the header of the UDP packet;
measure a time during which the port number remains unchanged; and
set the parameter when the time during which the port number remains unchanged exceeds a threshold.

8. The wireless access network device according to claim 1,
wherein the control unit is configured to calculate and set a value of a check sum in the header, on a basis of the parameter indicating the data amount that has been set.

* * * * *